United States Patent
Lando et al.

(10) Patent No.: US 9,270,219 B2
(45) Date of Patent: Feb. 23, 2016

(54) VOLTAGE-CONTROLLED DC LINK FOR VARIABLE FREQUENCY GENERATOR EXCITATION

(71) Applicant: HS Aerospace Dijon, Longvic (FR)

(72) Inventors: Jean-Louis Lando, Toulouse (FR); Pierre Valin-Saunal, Aussone (FR)

(73) Assignee: HS Aerospace Dijon, Longvid (FR)

( * ) Notice: Subject to any disclaimer, the term of this patent is extended or adjusted under 35 U.S.C. 154(b) by 17 days.

(21) Appl. No.: 14/287,802

(22) Filed: May 27, 2014

(65) Prior Publication Data

US 2014/0347019 A1    Nov. 27, 2014

(30) Foreign Application Priority Data

May 27, 2013 (EP) .................................. 13305684

(51) Int. Cl.
| | |
|---|---|
| H02P 11/00 | (2006.01) |
| H02H 7/06 | (2006.01) |
| H02P 9/00 | (2006.01) |
| H02P 9/48 | (2006.01) |
| H02P 9/10 | (2006.01) |
| H02P 9/30 | (2006.01) |

(52) U.S. Cl.
CPC ........ *H02P 9/48* (2013.01); *H02P 9/107* (2013.01); *H02P 9/305* (2013.01)

(58) Field of Classification Search
USPC ................................................ 322/22, 28, 32
See application file for complete search history.

(56) References Cited

U.S. PATENT DOCUMENTS

| | | | | |
|---|---|---|---|---|
| 4,602,206 | A * | 7/1986 | Walker | 323/211 |
| 4,728,806 | A * | 3/1988 | Baker et al. | 307/43 |
| 5,055,765 | A | 10/1991 | Rozman et al. | |
| 5,130,003 | A * | 7/1992 | Conrad | 204/176 |
| 5,175,877 | A * | 12/1992 | Streeter | 455/102 |
| 5,798,631 | A * | 8/1998 | Spee et al. | 322/25 |
| 5,998,880 | A * | 12/1999 | Kumar | 290/40 B |
| 6,118,678 | A * | 9/2000 | Limpaecher et al. | 363/60 |
| 6,801,019 | B2 * | 10/2004 | Haydock et al. | 322/17 |
| 6,882,550 | B1 * | 4/2005 | Baumgart | 363/40 |
| 7,227,273 | B2 * | 6/2007 | Ahmad et al. | 290/40 C |

(Continued)

FOREIGN PATENT DOCUMENTS

| | | |
|---|---|---|
| EP | 2477294 A1 | 7/2012 |
| FR | 2932161 A1 | 12/2009 |

OTHER PUBLICATIONS

European Search Report dated Jan. 14, 2014 for corresponding European Application No. 13305684.

(Continued)

*Primary Examiner* — Pedro J Cuevas
(74) *Attorney, Agent, or Firm* — Kinney & Lange, P.A.

(57) ABSTRACT

Apparatus for controlling the excitation current of a variable frequency generator (VFG) including means to create a voltage-regulated DC link using PMG power and frequency information, the latter being the image of the VFG mechanical input speed. A step-down voltage-controlled chopper is inserted between the passive rectifier stage and the excitation current control chopper. The control law of this voltage-controlled source is such that when the mechanical input speed of the VFG increases, its output (controlled DC-link voltage) decreases non-linearly, leading to DC link voltage varying from V (engine at idle) to V/2 (engine at take-off speed). The DC voltage becomes inverse-proportional to input mechanical speed.

12 Claims, 4 Drawing Sheets

(56) References Cited

U.S. PATENT DOCUMENTS

| | | | |
|---|---|---|---|
| 7,233,129 B2* | 6/2007 | Erdman et al. | 322/17 |
| 7,330,012 B2* | 2/2008 | Ahmad et al. | 318/811 |
| 7,339,355 B2* | 3/2008 | Erdman et al. | 322/29 |
| 7,372,174 B2* | 5/2008 | Jones et al. | 290/44 |
| 7,385,372 B2* | 6/2008 | Ahmad et al. | 318/811 |
| 7,402,983 B2* | 7/2008 | Jacobson et al. | 323/214 |
| 7,479,757 B2* | 1/2009 | Ahmad | 318/811 |
| 7,609,024 B2* | 10/2009 | Ahmad et al. | 318/811 |
| 7,638,890 B2* | 12/2009 | Lando et al. | 290/36 R |
| 7,659,700 B2* | 2/2010 | Holveck et al. | 323/214 |
| 7,759,821 B2* | 7/2010 | Lando et al. | 307/66 |
| 7,869,234 B2* | 1/2011 | Kazlauskas | 363/44 |
| 8,136,756 B2* | 3/2012 | Duces et al. | 244/58 |
| 8,253,358 B2* | 8/2012 | Lando | 318/266 |
| 8,378,608 B2* | 2/2013 | Robertson | 318/438 |
| 8,626,368 B2* | 1/2014 | Hendrickson et al. | 701/22 |
| 8,896,261 B2* | 11/2014 | Bando et al. | 318/810 |
| 2003/0107349 A1* | 6/2003 | Haydock et al. | 322/28 |
| 2005/0088861 A1* | 4/2005 | Baumgart | 363/40 |
| 2006/0001318 A1* | 1/2006 | Ahmad et al. | 307/10.1 |
| 2006/0001319 A1* | 1/2006 | Ahmad et al. | 307/10.1 |
| 2006/0001397 A1* | 1/2006 | Ahmad et al. | 318/801 |
| 2006/0131888 A1* | 6/2006 | Ahmad et al. | 290/40 C |
| 2006/0208707 A1* | 9/2006 | Jacobson et al. | 320/166 |
| 2008/0018309 A1* | 1/2008 | Erdman et al. | 322/20 |
| 2008/0084118 A1* | 4/2008 | Lando et al. | 307/66 |
| 2008/0252267 A1* | 10/2008 | Lando et al. | 322/90 |
| 2008/0290845 A1* | 11/2008 | Holveck et al. | 323/214 |
| 2010/0013300 A1* | 1/2010 | Lando | 307/9.1 |
| 2010/0076612 A1* | 3/2010 | Robertson | 700/286 |
| 2010/0193630 A1* | 8/2010 | Duces et al. | 244/58 |
| 2010/0246228 A1* | 9/2010 | Kazlauskas | 363/127 |
| 2012/0059537 A1* | 3/2012 | Hendrickson et al. | 701/22 |
| 2013/0003231 A1 | 1/2013 | Wagner et al. | |
| 2013/0241463 A1* | 9/2013 | Bando et al. | 318/810 |
| 2013/0307450 A1* | 11/2013 | Fuller et al. | 318/400.3 |

OTHER PUBLICATIONS

European Patent Office, Extended European Search Report, Jan. 27, 2014, 4 pages.

* cited by examiner

VOLTAGE-CONTROLLED DC LINK FOR VARIABLE FREQUENCY GENERATOR EXCITATION

CROSS-REFERENCE TO RELATED APPLICATION(S)

This application claims priority from European Application No. 13305684.6, filed May 27, 2013, entitled VOLTAGE-CONTROLLED DC LINK FOR VARIABLE FREQUENCY GENERATOR EXCITATION, which is incorporated by reference.

BACKGROUND

The present invention is concerned with improving the operation of variable frequency generators (VFG), in particular for controlling the excitation current of a VFG.

A variable frequency generator (VFG) is used in many applications where a power generator is required to generate outputs of different frequencies or voltages to power different loads. For example, modern aircraft power generation systems often use VFGs to provide electrical power to various on-board loads and applications.

Rotation of the main engine shaft is converted, by the VFG, into electrical energy which is then switched to appropriate frequencies as appropriate to power the various on-board applications and loads.

A variable frequency generator includes a permanent magnet generator (PMG), an exciter, and a main generator mounted for rotation on a common shaft. The shaft is driven by a prime mover such as a gas turbine engine.

A generator control unit (GCU) converts alternating current from the PMG to provide DC current to the exciter. Current from the exciter is fed to the main generator, which produces a voltage output.

FIG. 1 shows, as a schematic block diagram, an example of an existing VFG system. Excitation is provided to the VFG by rectifying, with no control—i.e. with a passive rectifier 6—the voltage produced by the permanent magnet generator 1 stage of the VFG, and then a controlled current, created by means of a chopper 7 operating in current-source mode, is injected into the VFG exciter 2 stage. This provides a DC link voltage with a variable magnitude directly dependent on the mechanical input speed to the VFG, from the input shaft 4, varying from a voltage V when the engine is at idle speed, to 2×V when the engine is at maximum (take-off, for aircraft) speed. The relationship between input frequency and DC link voltage is shown in FIG. 3.

Problems can occur in such VFGs leading to overvoltage situations. For example, a failure may occur inside the generator control unit (GCU) at the chopper stage, for example one of the switches may be stuck closed. This can happen, in particular, at high mechanical input speeds, and excitation control can be lost. The current source duty cycle may be brought to its maximum and the VFG output voltage would develop very quickly and become so large as to exceed the maximum voltage acceptable by the electrical loads.

Such overvoltage problems have been previously identified. Known techniques for preventing damage if such failure occurs include inserting an over-voltage protection unit (OPU) in series with the VFG excitation lines. The OPU senses the output voltage and immediately opens the excitation lines whenever an overvoltage occurs.

In systems in which overvoltage protection relies on the GCU monitoring the power supplied by the main generator and then tripping a switch to an open condition once an overvoltage threshold has been reached, further problems have been identified. For example, manufacturing defects or environmental effects may simultaneously disable the GCU and cause abnormally high generator output values. The disabled GCU is then unable to detect or react to these high output values.

US 2013/0003231 provides an alternative overvoltage protection technique involving predicting a primary control current to provide a predicted control current and detecting an overvoltage condition based on a comparison of the predicted control current and the primary control current and interrupting the primary control current based on the comparison.

Such systems, however, still have the problems identified above in that the VFG output overvoltage is dependent on mechanical input speed and can develop to a very high value very quickly, exceeding the maximum acceptable voltage and causing damage if the OPU reaction time is not appropriate.

SUMMARY

The present invention aims to deal with overvoltage in a different way, without using an OPU and, instead, creating a voltage-regulated DC link using PMG power and frequency information.

Accordingly, the present invention provides apparatus for controlling the excitation current of a variable frequency generator driven by a rotator shaft, comprising means for generating a voltage-regulated DC link voltage that decreases non-linearly with increasing speed of the rotating shaft; and means for deriving, from the DC link voltage, a controlled current for injection into the variable frequency generator.

Whilst the key to the invention is that an inversely proportional voltage-regulated DC link voltage is generated from which a controlled current is derived, the most preferred embodiment comprises a controlled DC link generating circuit for generating the voltage-regulated DC link and a generator control unit physically separate from, but electrically connected to the output of the controlled DC link circuit.

In a most preferred embodiment, the controlled DC link generating circuit comprises a rectifier to rectify the input voltage created from the rotation of the rotator shaft, and a step-down chopper circuit electrically connected to the output of the rectifier to output a controlled DC link voltage that decreases with increased frequency of rotation of the rotator shaft.

In a most preferred embodiment, the means for deriving the controlled current comprises a chopper operating in current-source mode.

According to another aspect of the invention, there is provided a system for generating a variable frequency power output from energy provided by rotation of an input shaft. The system comprises a variable frequency generator motor arrangement and apparatus, as described above, for controlling the excitation current thereof.

Most preferably, the variable frequency generator arrangement comprises a permanent magnet generator to receive rotation of the input shaft, an exciter, and a main generator, the variable frequency output being provided by the output of the main generator.

Most preferably, the apparatus for controlling the excitation current of the variable frequency generator receives excitation signals from the permanent magnet generator and outputs controlled exciter signals which are injected into the exciter.

According to another aspect of the invention, there is provided a method of controlling the excitation current of a variable frequency generator driven by a rotator shaft, said method comprising generating a voltage-regulated DC link voltage that decreases non-linearly with increasing speed of the rotating shaft and deriving, from the DC link voltage, a controlled current for injection into the variable frequency generator.

In a most preferred embodiment, although the control apparatus and method could find application in many systems requiring variable frequency power control, the invention comprises an aircraft power distribution system having a variable frequency generator and apparatus for controlling the excitation current thereof, as defined above.

BRIEF DESCRIPTION OF THE DRAWINGS

Preferred embodiments of the invention will now be described by way of example only, with reference to the drawings, in which.

DETAILED DESCRIPTION

Figure 1:
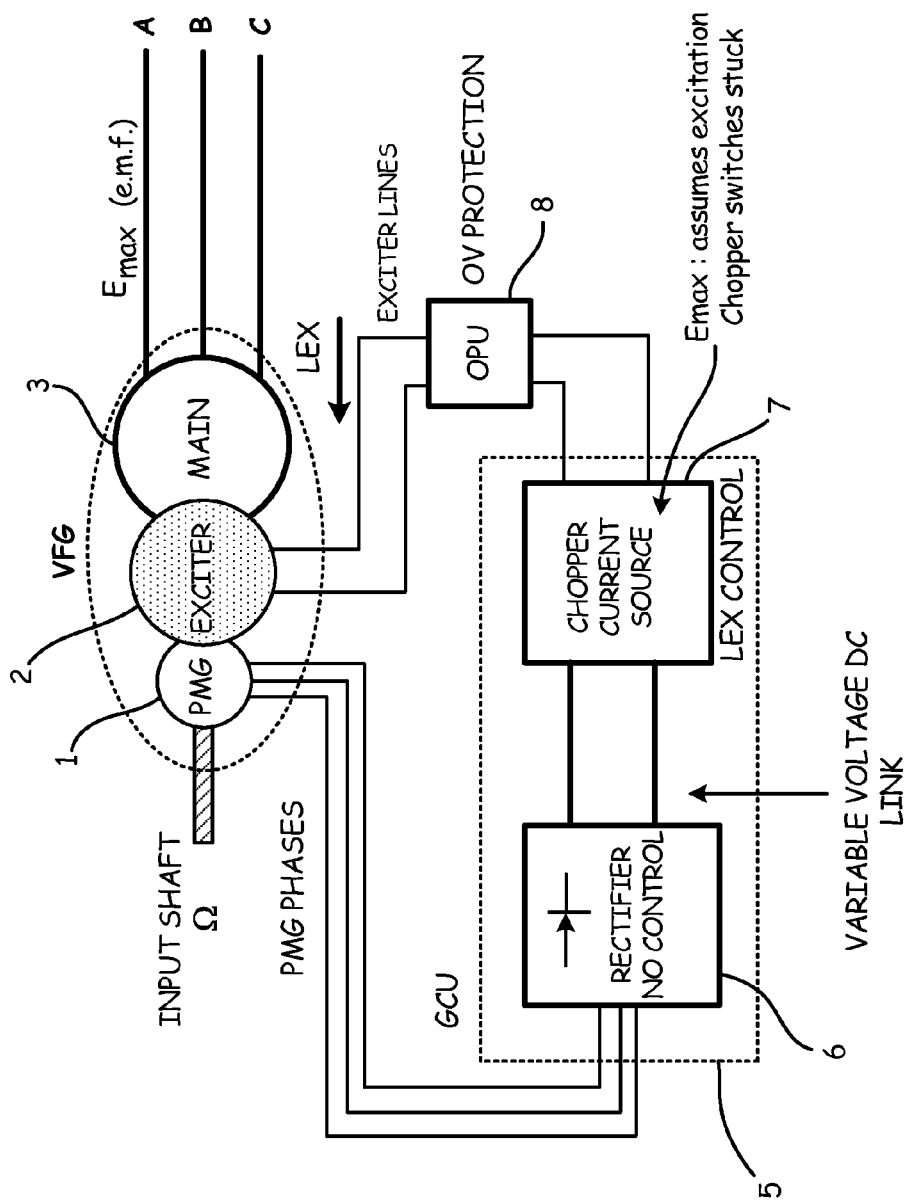
FIG. 1 shows a schematic circuit diagram of an existing VFG with overvoltage protection provided by an OPU.
Figure 2:
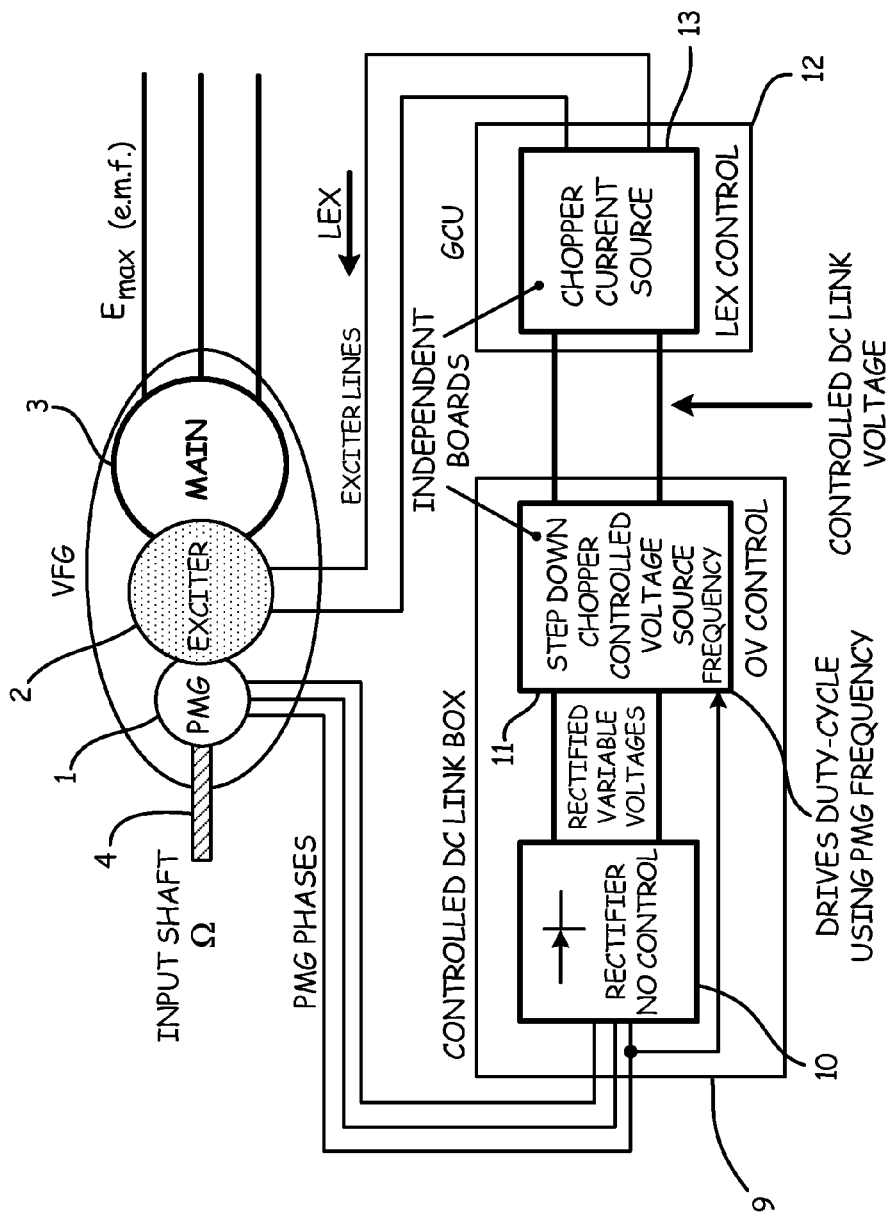
FIG. 2 shows a schematic circuit diagram of a VFG and control system according to the present invention.

With reference to both FIG. 1 and FIG. 2, an example VFG, driven by an input shaft 4 from the, for example, aircraft engine, e.g. a gas turbine engine, includes a permanent magnet generator (PMG) 1, an exciter 2 and a main generator 3. These three machine components are mounted on a common rotor shaft.

Preferably, the permanent magnet generator (PMG) includes a rotor assembly and a stator assembly (not shown). The stator assembly supplies power for generator excitation, as well as power for other components of the electrical system.

The exciter also preferably includes a rotor assembly and a stator assembly (not shown).

The system further includes a generator control unit (GCU) 5 connected between the PMG and the exciter. The exciter receives field excitation from the PMG through the GCU.

The GCU, in the example shown, includes a passive rectifier 6 and a chopper 7 operating in current source mode.

In commonly available generators, permanent magnets of the PMG rotate with rotation of the motor shaft 4 to create an excitation field causing rotation of the PMG rotor(s). The rotation is rectified by a rectifier 6. Thus the rectifier 6 rectifies the voltage produced by the PMG 1. The variable voltage DC link output by the rectifier is then subjected to a current control function by means of a chopper 7 operating in current-source mode. The resulting controlled current is injected into the VFG exciter 2.

The rotor assembly of the exciter provides an output to the main generator 3 which provides the desired output voltage which is achieved by controlling the chopper.

In order to monitor and respond to overvoltage situations, in prior art systems, an overvoltage prevention unit (OPU) 8 is provided between the GCU 5 and the exciter 2. This monitors the control current from the GCU for an excessive voltage and causes a switch to open to interrupt flow of the control current to the exciter in the event of detection of overvoltage.

Figure 3:
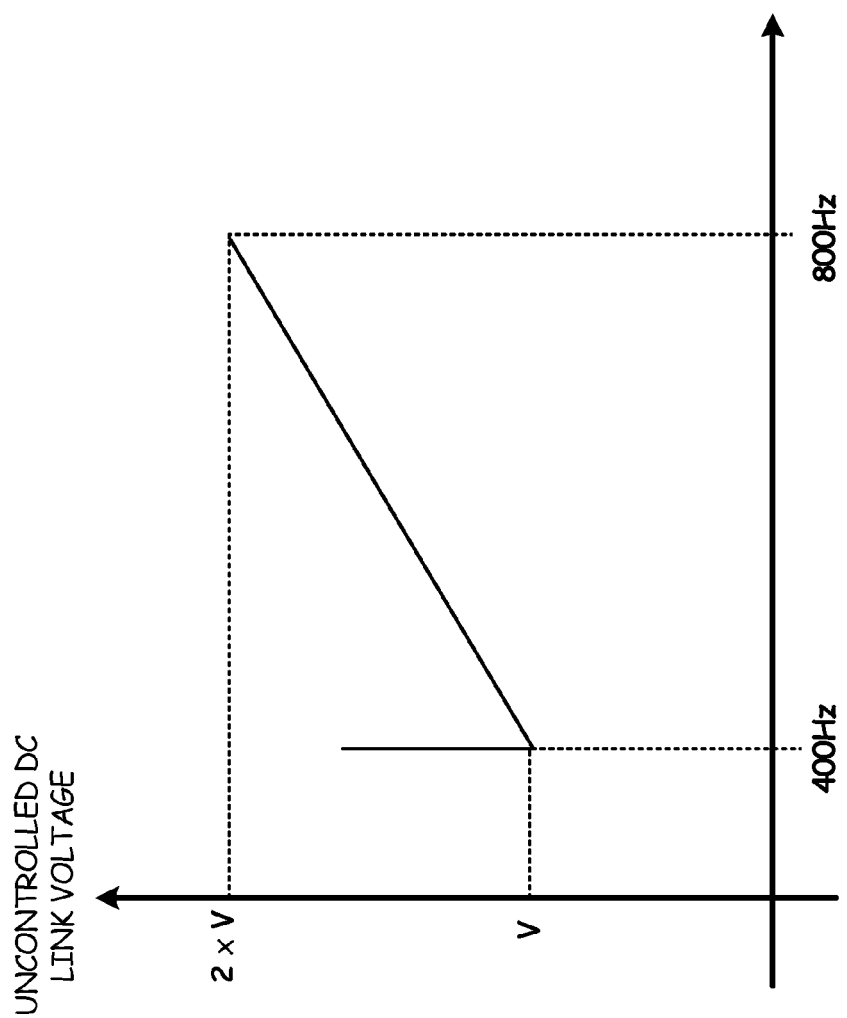
FIG. 3 shows an example of an uncontrolled DC link voltage varying with input frequency as a result of prior art systems such as shown in FIG. 1.

As mentioned above, and as shown in FIG. 3, the DC link voltage generated by the GCU is of a magnitude directly dependent on the input speed from the input shaft and can, therefore, be very high when the input shaft speed is at its maximum.

Referring now to FIG. 2, the present invention removes the OPU and separates the DC voltage source and the excitation current chopper.

Figure 4:
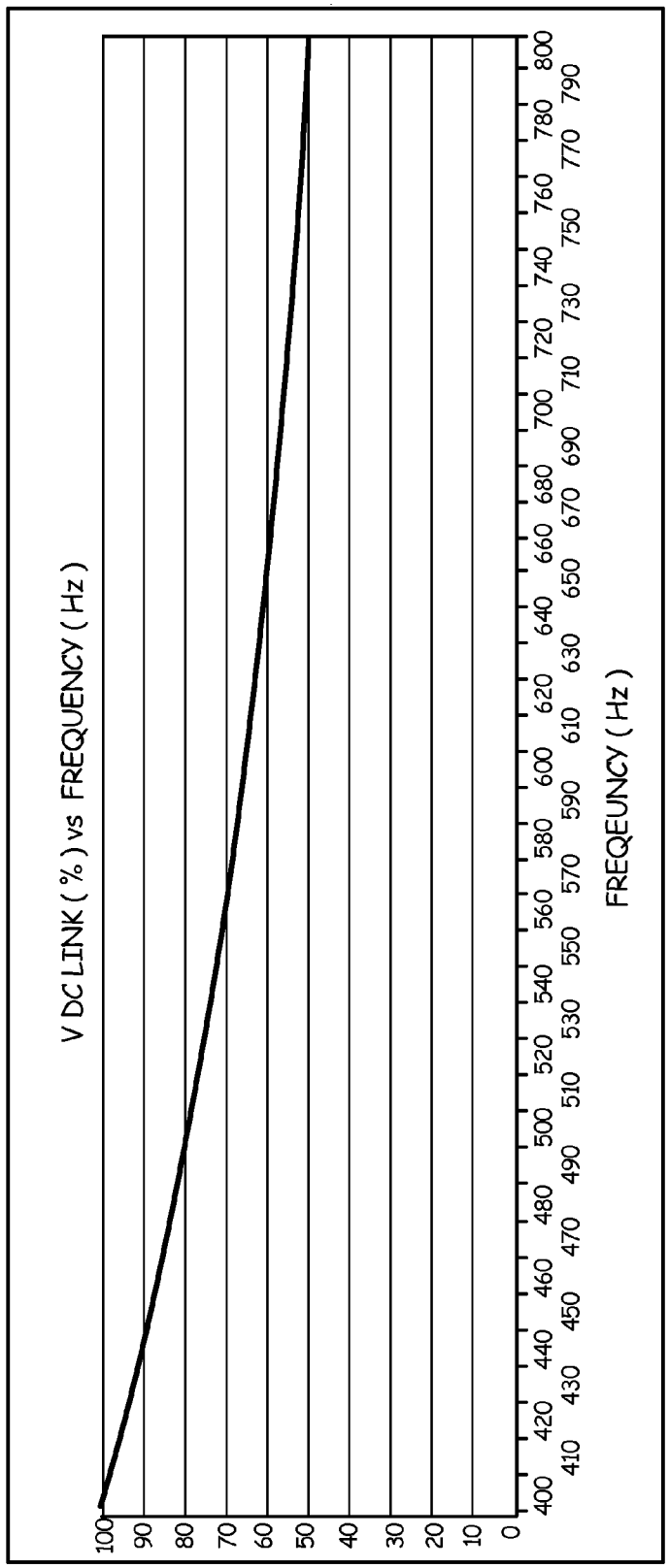
FIG. 4 shows an example of how the controlled DC link voltage of the present invention varies with input frequency.

A step-down voltage-controlled chopper 11 is connected to the output of the passive rectifier 10 to provide overvoltage control at this stage. The control law of this voltage-controlled source is such that when the mechanical input speed of the VFG increases, the output of this chopper is a controlled DC-link voltage that decreases non-linearly. Thus, the DC-link voltage varies from V when the engine is at an idle speed to V/2 when the engine is at its maximum (take-off) speed—i.e. the DC-link voltage is inversely proportional to the input shaft mechanical speed. An example of the DC link control is shown in FIG. 4. This controlled DC-link voltage is then subject to the current control function of the GCU 12 using a current-source chopper 13 as described in relation to FIG. 1 and this is provided to the exciter 2 of the VFG.

The present invention ensures that an overvoltage that might occur during an excitation chopper failure is limited and its magnitude can be chosen by design. Moreover, the overvoltage magnitude becomes independent (at first order) of the VFG mechanical input speed. Separating, physically, the excitation current chopper 13 and the DC voltage source 4 (rectifier and step-down voltage chopper) will ensure independence of failure. Thus, when a failure occurs on one sub-assembly, it will not impact the operation of the other sub-assembly, but can be monitored and detected thereby, consequently shutting the whole system down, and leading to a very safe operation. Using this technique would allow the overall voltage regulation loop of the VFG-GCU system to become more stable because the system gain trends to become constant over speed range. The full duty cycle of the excitation current loop can be used because this new concept makes a VFG-GCU generator behave like an IDG (integrated drive generator)-GCU system in terms of voltage transients.

This invention could be used on all applications using variable frequency generators, specifically those requiring a high integrity over-voltage protection. One application is in aircraft and the invention is particularly applicable to aircraft having engines with high speed ratio between idle and maximum take-off speed, for example, but not limited to, turbofan-equipped aircraft.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An apparatus for controlling the excitation current of a variable frequency generator driven by a rotator shaft, comprising:
    a step-down chopper configured to output a voltage-regulated DC link voltage that is inversely proportional to a rotational speed of the rotator shaft; and
    a chopper current source configured to derive, from the voltage-regulated DC link voltage, a controlled current for injection into the variable frequency generator using the voltage-regulated DC link voltage.

2. A system for generating a variable frequency power output from energy provided by rotation of an input shaft; wherein the system comprises a variable frequency generator motor and the apparatus as defined in claim 1, for controlling the excitation current thereof.

3. The system of claim 2, wherein the variable frequency generator comprises a permanent magnet generator to receive rotation of the input shaft, an exciter, and a main generator, the variable frequency output being provided by the output of the main generator.

4. The system of claim 2, wherein the apparatus for controlling the excitation current of the variable frequency generator receives excitation signals from the permanent magnet generator and outputs controlled exciter signals which are injected into the exciter.

5. A method of controlling the excitation current of a variable frequency generator driven by a rotator shaft, said method comprising:
    generating, by a step-down chopper circuit, a voltage-regulated DC link voltage that is inversely proportional to a rotational speed of the rotating shaft; and
    deriving, by a chopper current source, a controlled current using the voltage-regulated DC link current for injection into the variable frequency generator.

6. An aircraft power distribution system comprising:
    a variable frequency generator driven by a rotator shaft;
    a controlled DC link generating circuit that generates a voltage-regulated DC link voltage that is inversely proportional to a rotational speed of the rotator shaft; and
    a generator control unit that derives from the voltage-regulated DC link voltage a controlled current for injection into the variable frequency generator.

7. The system of as claimed in claim 6, wherein the generator control unit is physically separate from, but electrically connected to an output of the controlled DC link circuit.

8. The system as claimed in claim 6, wherein the controlled DC link generating circuit comprises a rectifier to rectify the input voltage created from the rotation of the rotator shaft, and a step-down chopper circuit electrically connected to the output of the rectifier to output a controlled DC link voltage that decreases with increased frequency of rotation of the rotator shaft.

9. The system as claimed in claim 6, wherein the generator control unit comprises a chopper operating in current-source mode.

10. The apparatus of claim 1, further comprising:
    a first circuit board, wherein the step-down chopper is configured on the first circuit board; and
    a second circuit board physically separate from, and electrically connected to, the first circuit board, wherein the chopper current source is configured on the second circuit board.

11. The apparatus of claim 10, wherein the first circuit board further includes a passive rectifier configured to receive an AC voltage from the variable frequency generator and convert the AC voltage into a rectified DC voltage for the step-down chopper.

12. The apparatus of claim 1, wherein a duty cycle of the step-down chopper circuit is actively controlled using an operating frequency of the variable frequency generator.

\* \* \* \* \*